N. P. MADER.
BELT FASTENER.
APPLICATION FILED DEC. 29, 1915.

1,196,374.

Patented Aug. 29, 1916.

Inventor
Nickolas P. Mader
By Hazard, Berry & Miller
Attys.

UNITED STATES PATENT OFFICE.

NICKOLAS P. MADER, OF BEAUMONT, CALIFORNIA.

BELT-FASTENER.

1,196,374.  Specification of Letters Patent.  Patented Aug. 29, 1916.

Application filed December 29, 1915. Serial No. 69,191.

*To all whom it may concern:*

Be it known that I, NICKOLAS P. MADER, a citizen of the United States, residing at Beaumont, in the county of Riverside and State of California, have invented new and useful Improvements in Belt-Fasteners, of which the following is a specification.

This invention relates to a belt fastener.

It is the object of this invention to provide a belt fastener of the staple type, that is, with spaced teeth or prongs adapted to be driven through the adjacent ends of a belt and clenched thereon, which is so constructed that the teeth will be formed with rounded inner faces and free from sharp corners so as not to cut the fibers of the belt on pulling strains being exerted on the latter.

Another object is to provide a belt fastening staple which is so formed as to be reinforced and strengthened at points where subjected to breaking strains.

A further object is to provide the clenching teeth with a transverse arcuate face and rounded edges on their outer portions so that after they are driven through the belt and clenched in engagement therewith, the inturned ends of the teeth will not cut into the belt.

Another object is to provide the fastener with tapered teeth having a gradually decreasing transverse arcuate cross section from its base toward its tip, thereby reinforcing the teeth and permitting the use of a lighter and thinner material than can be practically employed in the manufacture of the belt fasteners now generally in use, which is advantageous in that the fasteners will project but a short distance from the surface of the belt and will not interfere with the smooth running of the latter.

Another object is to provide the fastener with means for facilitating its alinement on the belt.

A further object is to form the fastener in such manner that when driving it in place, the teeth or prongs thereof will not have a tendency to spread.

Other objects will appear hereinafter.

Figure 1:
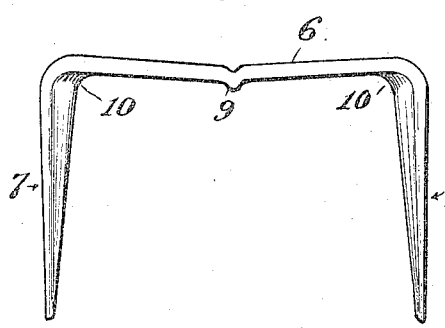
Figure 2:
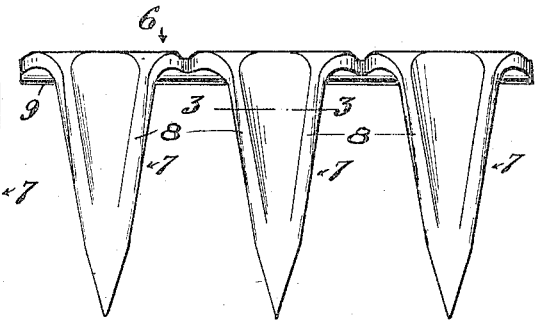
Figure 3:
Figure 4:
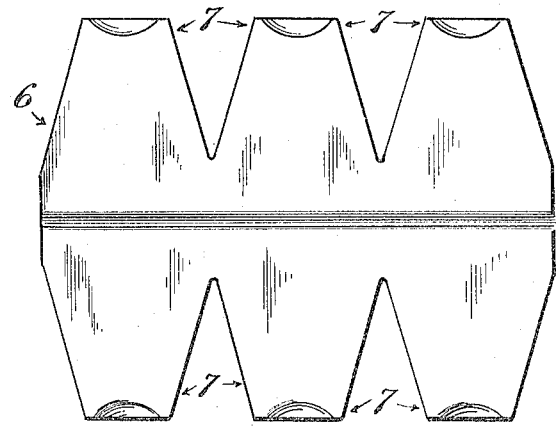
Figure 5:
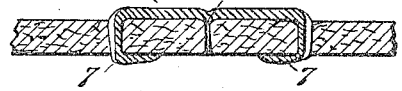
Figure 6:
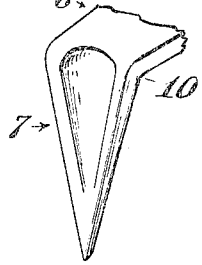
Figure 7:
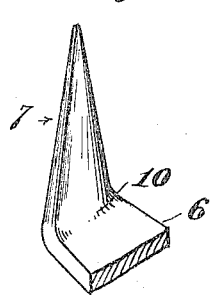

The invention is illustrated in the accompanying drawings in which:

Figure 1 is a view of the fastener in end elevation. Fig. 2 is a view of same in side elevation. Fig. 3 is an enlarged transverse section on the line 3—3 of Fig. 2 showing the arcuate formation of the tooth. Fig. 4 is a plan view of the fastener. Fig. 5 is a view in longitudinal section, illustrating the fastener as applied. Fig. 6 is a detail view in perspective of the fastener tooth as seen from its outer side. Fig. 7 is a similar view showing the inner side of the fastener tooth.

More specifically, 6 indicates the body member of the fastener which is formed of thin sheet material of any suitable character and which constitutes the connecting part of the fastener. This body member 6 has V-shaped cut away portions on its opposite edges to form a plurality of tapered teeth 7 which are bent downwardly at a point intermediate their ends to extend substantially parallel with each other approximately at right angles to the body member 6. The teeth 7 are bent at such point that their width at their bend will nearly correspond to the width of the space between the adjacent teeth at the base of the downwardly extending portions thereof, as particularly shown in Fig. 4, so that when the teeth are driven through a belt there will be sufficient material between the teeth to not weaken the belt at this point.

The essence of the present invention resides in forming the downwardly extending portion of the teeth 7 with an inwardly extending arcuate cross section, as shown in Fig. 3, with the corners of the teeth rounded so as to remove sharp edges which would tend to cut the belt. The teeth 7 being tapered, the arcuate portion gradually decreases in cross section from the base of the tooth toward its pointed end, as shown in Fig. 1. By thus forming the tooth with an arcuate cross section, it is provided with a convex inner face and a concave outer face, the latter being thus bounded on its sides by convergent ribs 8, the outer faces of which extend substantially at right angles to the body portion 6 and serve, in coöperation with the arcuate section of the tooth, to reinforce the latter. This construction permits of thin, light material being employed in the manufacture of the fastener and is a construction which is advantageous in the application of the invention in that the fasteners will project but slightly from the surface of the belt and will therefore not interfere with the smooth running of the latter. Furthermore, the tooth is strengthened by this formation so as not to bend readily when driving it through the belt.

As a means for preventing spreading of the teeth 7 in driving them through the belt, the body portion 6 is concaved longitudinally, as illustrated in Fig. 1. The outer side portions of the body member 6 at the base of the downwardly bent portions of the teeth 7 will thus be disposed on a plane slightly higher than the longitudinal center of the fastener. By this construction, in driving the fastener in place, such, for instance, by means of a hammer, the latter will not strike the center of the fastener but the blow will be delivered at the base of the teeth. However, when the fastener is put in place and the teeth are clenched in engagement with the belt, as shown in Fig. 5, the body portion 6 will be drawn substantially flat so as to lie on the plane of the surface of the belt.

In order to facilitate the application of the fastener and to assist in alining the same with the contiguous end portions of the belt, the fastener is formed with a longitudinally extending rib 9 on its under side which is adapted to register with the joint between the abutting ends of the belt, as shown in Fig. 5.

By the construction herein before described, a strong fastener is provided as well as one which will not cut the belt when longitudinal pull is exerted on the latter. The strength and non-cutting qualities of the fastener are obtained by the arcuate formation of the teeth or prongs 7; the arched inner face of the teeth presenting a rounded surface against which the pull of the belt bears, so as not to cut the latter. This arched formation also serves to resist straightening of the teeth on pulling strains being imposed thereon. The teeth are further strengthened at the point of intersection with the body member 6 by forming a fillet 10, as particularly shown in Fig. 7.

In the application of the invention, the two ends 11 and 12 of a belt are butted together and the staple fastener driven therethrough with the teeth of the fastener arranged on the opposite sides of a butt joint, as shown in Fig. 5. After the staple has been driven in place, the ends of the teeth 7 are bent inwardly toward each other to clench the fastener against removal.

What I claim is:

1. A belt fastener, comprising a body member, and a plurality of tapered teeth on the longitudinal edges of the body portion formed with arcuate cross sections diminishing from the base of the teeth toward their outer ends, and reinforcing fillets at the juncture of the teeth with the body member.

2. A belt fastener, comprising a body member diverging upwardly from its longitudinal center, having a downwardly projecting centrally disposed rib on its under side and extending lengthwise thereof, and a plurality of tapered teeth on the longitudinal edges of the body portion formed with arcuate cross sections diminishing from the base of the teeth toward their outer ends, and reinforcing fillets at the juncture of the teeth with the body member.

In testimony whereof I have signed my name to this specification.

NICKOLAS P. MADER.

Copies of this patent may be obtained for five cents each, by addressing the "Commissioner of Patents, Washington, D. C."